United States Patent
Brown et al.

(10) Patent No.: US 12,159,292 B2
(45) Date of Patent: Dec. 3, 2024

(54) CONDITIONAL WEB CONTENT UPDATES BASED ON DYNAMIC ENVIRONMENTAL DATA

(71) Applicant: Golfback LLC, Camp Hill, PA (US)

(72) Inventors: John M Brown, Enola, PA (US); Brent Miller, Grand Island, FL (US); Bryce Voisin, Winter Garden, FL (US)

(73) Assignee: Golfback, LLC, Camp Hill, PA (US)

( * ) Notice: Subject to any disclaimer, the term of this patent is extended or adjusted under 35 U.S.C. 154(b) by 223 days.

(21) Appl. No.: 17/526,224

(22) Filed: Nov. 15, 2021

(65) Prior Publication Data

US 2022/0156768 A1    May 19, 2022

Related U.S. Application Data

(60) Provisional application No. 63/113,936, filed on Nov. 15, 2020.

(51) Int. Cl.
*G06Q 30/00* (2023.01)
*G06F 3/04842* (2022.01)
*G06Q 10/087* (2023.01)
*G06Q 30/0202* (2023.01)

(52) U.S. Cl.
CPC ..... *G06Q 30/0202* (2013.01); *G06F 3/04842* (2013.01); *G06Q 10/087* (2013.01)

(58) Field of Classification Search
None
See application file for complete search history.

(56) References Cited

U.S. PATENT DOCUMENTS

| 7,103,560 B1 * | 9/2006 | Fox | G06Q 10/00 705/7.34 |
| 9,031,860 B2 * | 5/2015 | Winters | G06Q 30/0222 705/14.1 |

(Continued)

OTHER PUBLICATIONS

Taghizadeh, Elham. "Utilizing artificial neural networks to predict demand for weather-sensitive products at retail stores." arXiv preprint arXiv:1711.08325 (2017). (Year: 2017).*

(Continued)

*Primary Examiner* — Gurkanwaljit Singh
(74) *Attorney, Agent, or Firm* — Gabriel & Co; Andrew M Gabriel

(57) ABSTRACT

One embodiment provides a method, including: obtaining, using the set of one or more processors, a plurality of user selections provided via a graphical user interface (GUI); establishing, using the set of one or more processors, an association between the plurality of user selections and display data for a time series of a plurality of inventory items; obtaining, using the set of one or more processors, a time series of forecasting data via an application programming interface (API) call to a remote system; associating, using the set of one or more processors, the time series of forecasting data with the time series of the plurality of inventory items; and thereafter generating or updating, using the set of one or more processors, the display data for the time series of the plurality of inventory item on one or more web pages of an entity associated with the GUI based on the forecasting data and the plurality of user selections. Other embodiments are described and claimed.

9 Claims, 7 Drawing Sheets

(56) References Cited

U.S. PATENT DOCUMENTS

| | | | | |
|---|---|---|---|---|
| 2007/0100683 A1* | 5/2007 | Gartner | ............... | G06Q 10/04 |
| | | | | 705/7.31 |
| 2009/0276317 A1* | 11/2009 | Dixon | ............... | G06Q 10/087 |
| | | | | 705/14.61 |
| 2016/0019563 A1* | 1/2016 | Jha | ................ | G06Q 30/0202 |
| | | | | 705/7.31 |
| 2016/0019568 A1* | 1/2016 | Batrakov | ......... | G06Q 10/0875 |
| | | | | 705/29 |

OTHER PUBLICATIONS

Chin, Siong Sheng, Edmund Chan, and Terence Yeo. "Implementation of inventory analysis tool for optimization and policy selection." 2008 4th IEEE International Conference on Management of Innovation and Technology. IEEE, 2008. (Year: 2008).*

Abeysekara, Thushan Kavishka, and Sulochana Rupasinghe. "Analysis of Influential Factors for Inventory Forecasting Systems." 2019 IEEE 5th International Conference for Convergence in Technology (I2CT). IEEE, 2019. (Year: 2019).*

M. Ben Ghalia and P P. Wang, "Intelligent system to support judgmental business forecasting: the case of estimating hotel room demand," in IEEE Transactions on Fuzzy Systems, vol. 8, No. 4, pp. 380-397, Aug. 2000 (Year: 2000).*

\* cited by examiner

```
{
  "cod": "200",
  "message": 0.0179,
  "cnt": 96,
  "list": [
    {
      "dt": 1596632400,
      "main": {
        "temp": 289.16,
        "feels_like": 288.41,
        "temp_min": 289.16,
        "temp_max": 289.16,
        "pressure": 1013,
        "sea_level": 1013,
        "grnd_level": 1010,
        "humidity": 78,
        "temp_kf": 0
      },
      "weather": [
        {
          "id": 804,
          "main": "Clouds",
          "description": "overcast clouds",
          "icon": "04n"
        }
      ],
      "clouds": {
        "all": 100
      },
```

FIG. 4A

```
      "wind": {
        "speed": 2.03,
        "deg": 252,
        "gust": 5.46
      },
      "visibility": 10000,
      "pop": 0.04,
      "sys": {
        "pod": "n"
      },
      "dt_txt": "2020-08-05 13:00:00"
    },
    .....
  ],
  "city": {
    "id": 2643743,
    "name": "London",
    "coord": {
      "lat": 51.5085,
      "lon": -0.1258
    },
    "country": "GB",
    "timezone": 0,
    "sunrise": 1568958164,
    "sunset": 1569002733
  }
}
```

FIG. 4B

```
Execution Time: 10/08/20 02:00 AM
Season: All Year 01/01 - 12/31 [fada4231-bd56-4719-bb37-38519771df39]
Tee Times: 12 PM - 01 PM
Total Tee Times: 32
Remaining Tee Times: 15
Sold Tee Times: 17
Utilization: 53%
Rate Time Period: 07:00 AM - 12:59 PM [ef720440-3c27-4263-b876-d89c7638ae16]
Rate Plan: Public [01a02fac-de91-4810-acfc-29f28c10700a]
Rate: [5a6dbacd-4855-4d68-8d3d-f2affc17c281]
Base Rate Thu: $90.00
Yield Time Period: 11:00 AM - 12:59 PM [0af79078-14b0-46d9-b3e1-aa00ad8eee62]
Yield Utilization Level: 50 - 59
Yield Day Out: 0
Yield Percent: 85%
Yield Calc: $76.50 = 90 * (85 / 100)
Weather: 78.13F Sunny - 10/08/2020 11:00 AM
Weather Threshold: [3d1c71cd-60e2-481d-a387-e8eec11c7270]
Weather Threshold Percent: 107%
Weather Calc: $81.86 = 76.5 * (107 / 100)
Total: $81.86
Rounding: Nearest
Final Total: $82.00
```

FIG. 4C

CONDITIONAL WEB CONTENT UPDATES BASED ON DYNAMIC ENVIRONMENTAL DATA

CROSS-REFERENCE TO RELATED APPLICATIONS

This application claims priority to provisional U.S. patent application Ser. No. 63/113,936, filed Nov. 15, 2020, the contents of which are incorporated by reference herein in their entirety.

BACKGROUND

Inventory management requires accurate and timely data to facilitate decisions related to supply, availability and marketing, among others. Typically an inventory or supply chain management platform offers users insights into existing inventory, its state such as available, sold, location, etc., and offers options to manage inventory.

Certain inventory items are time sensitive and use of the same is scheduled in advance, such as golf tee times at a golf course. Conventional inventory management platforms allow users to review past conditions to ascertain if inventory was adequate and utilized to maximum benefit. In view of such reports, users may adjust approaches to handling inventory in the future, such as updating the availability of inventory by adjusting conditions of use, etc.

Notwithstanding the ability to access historical data and use the same to generate reports related to past inventory and its management, a need exists in assisting with predictive technologies to help users make better decisions with respect to future inventory utilization.

BRIEF SUMMARY

In summary, one embodiment provides a method, comprising: obtaining, using the set of one or more processors, a plurality of user selections provided via a graphical user interface (GUI); establishing, using the set of one or more processors, an association between the plurality of user selections and display data for a time series of a plurality of inventory items; obtaining, using the set of one or more processors, a time series of forecasting data via an application programming interface (API) call to a remote system; associating, using the set of one or more processors, the time series of forecasting data with the time series of the plurality of inventory items; and thereafter generating or updating, using the set of one or more processors, the display data for the time series of the plurality of inventory item on one or more web pages of an entity associated with the GUI based on the forecasting data and the plurality of user selections.

Another embodiment provides a system, comprising: a set of one or more processors; a memory operatively connected to the set of one or more processors and storing processor-executable code configured for: obtaining, using the set of one or more processors, a plurality of user selections provided via a graphical user interface (GUI); establishing, using the set of one or more processors, an association between the plurality of user selections and display data for a time series of a plurality of inventory items; obtaining, using the set of one or more processors, a time series of forecasting data via an application programming interface (API) call to a remote system; associating, using the set of one or more processors, the time series of forecasting data with the time series of the plurality of inventory items; and thereafter generating or updating, using the set of one or more processors, the display data for the time series of the plurality of inventory item on one or more web pages of an entity associated with the GUI based on the forecasting data and the plurality of user selections.

A further embodiment provides a product, comprising: a non-transitory computer readable storage medium that stores code executable by a set of one or more processors, the code comprising: code that obtains a plurality of user selections provided via a graphical user interface (GUI); code that establishes an association between the plurality of user selections and display data for a time series of a plurality of inventory items; code that obtains a time series of forecasting data via an application programming interface (API) call to a remote system; code that associates the time series of forecasting data with the time series of the plurality of inventory items; and code that thereafter generates or updates the display data for the time series of the plurality of inventory item on one or more web pages of an entity associated with the GUI based on the forecasting data and the plurality of user selections.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, in conjunction with the accompanying drawings.

BRIEF DESCRIPTION OF THE SEVERAL VIEWS OF THE DRAWINGS

FIG. 4A-B illustrates an example of a forecast data message.

FIG. 4C illustrates an example output of a weather dynamic pricing change calculation.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of those embodiments.

Reference throughout this specification to "embodiment(s)" (or the like) means that a particular feature, structure, or characteristic described in connection with the embodiment is included in at least one embodiment. Thus, appearances of the phrases "according to embodiments" or "an embodiment" (or the like) in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well known structures, materials, or operations are not shown or described in detail to avoid obfuscation.

An embodiment provides a management platform that facilitates use of forecast data to make predictive updates to web page displays related to inventory management. By way of example, an embodiment implements a dynamic pricing technology, e.g., associated with an automated booking engine, which may assist golf course operators in managing inventory in a more intelligent, data-driven way. This permits a user to enter data, such as utilization ranges, pricing parameters, and weather impact metrics, that permit the system to thereafter generate automated web site display updates based on future utilization estimates and dynamically changing environmental data. This provides the user with a technical solution that links utilization management tools, which conventionally have focused on report generation for analyzing historical inventory utilization, with web site update technology, which generally has relied upon separate tools or third party vendors to implement. Further, various other embodiments are provided, the detailed description of which is made in connection with the figures.

Turning now to the figures, representative example embodiments are described to provide a better understanding of the appended claim(s).

Figure 1:
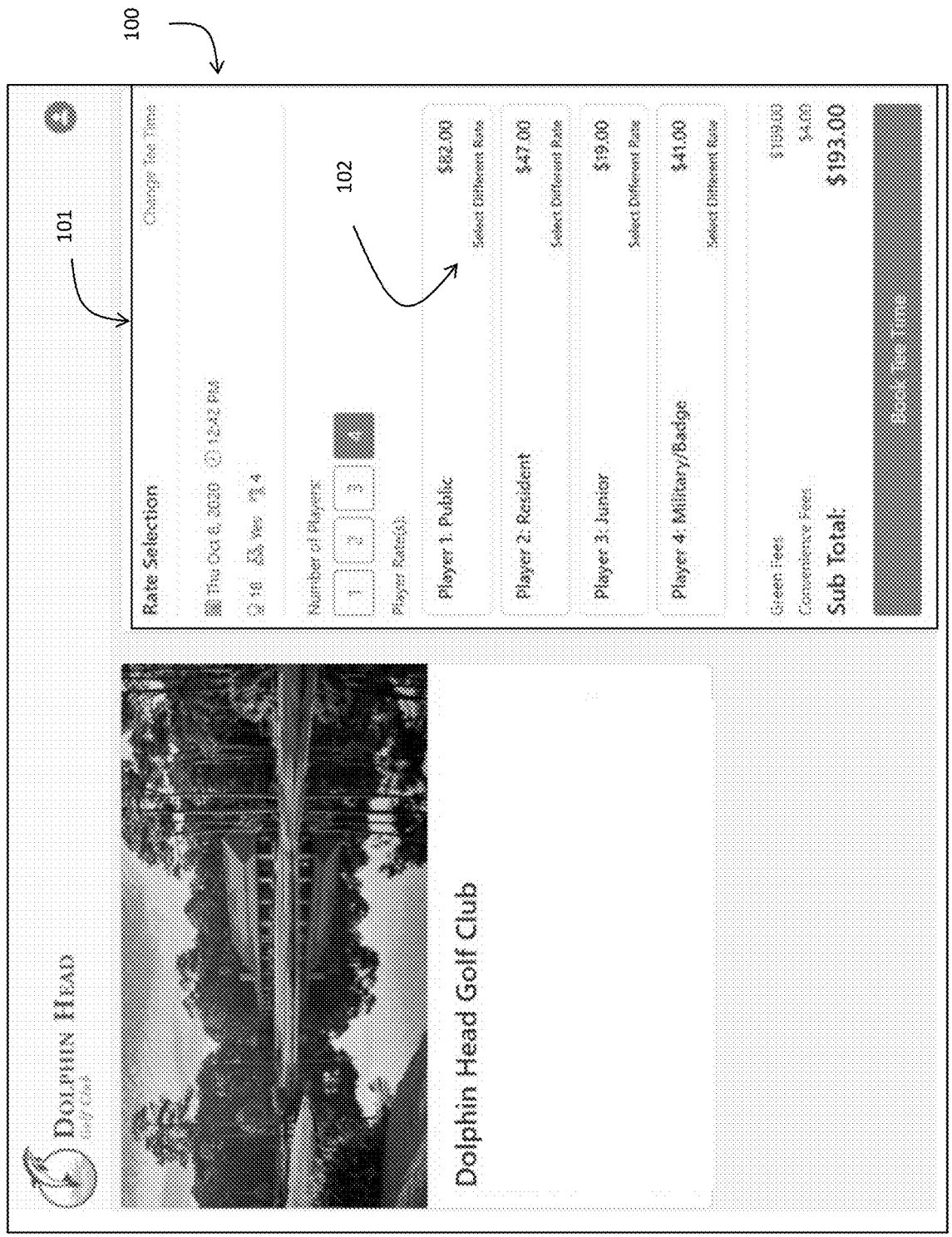
FIG. 1 illustrates an example view of a web site display.

Referring to FIG. 1, an embodiment provides a platform that acts on data to dynamically adjust a web site display 100, such as display data 101 related to inventory, which in the example of FIG. 1 includes data related to inventory 102, in order to facilitate management thereof. In the example of FIG. 1, a view of a web page 100 is provided, noting that an embodiment may also update display data for a mobile display, whether a mobile web application or a native application, etc. The web site 100 is displayed to an end user. In the view of the web page 100 are data related to inventory 102, such as prices associated with tee times, that dynamically changes based on environmental data, such as weather forecast data, as well as user configurations. In the example of FIG. 1 data related to inventory 102 includes a tee time listed at 12:42 PM along with rates that are dynamically updated, as described herein. In one example, each tee time is associated with a base rate and an adjusted, actual rate that is displayed on the web page 100. If an end user, e.g., a golfer wishing to book a tee time, interfaces with, e.g., clicks on, a tee time, one or more rates are displayed, which may correspond to different rates associated with the tee time, e.g., public, resident, junior, and military rates.

As may be appreciated from FIG. 1, if a user selects a particular tee time for booking, e.g., 12:42 PM, the user may navigate the web page 100 to permit the user to select a number of players (e.g., 1-4) and to specify the rate which applies to each player. This adjusts the overall value of the booking.

Figure 2:
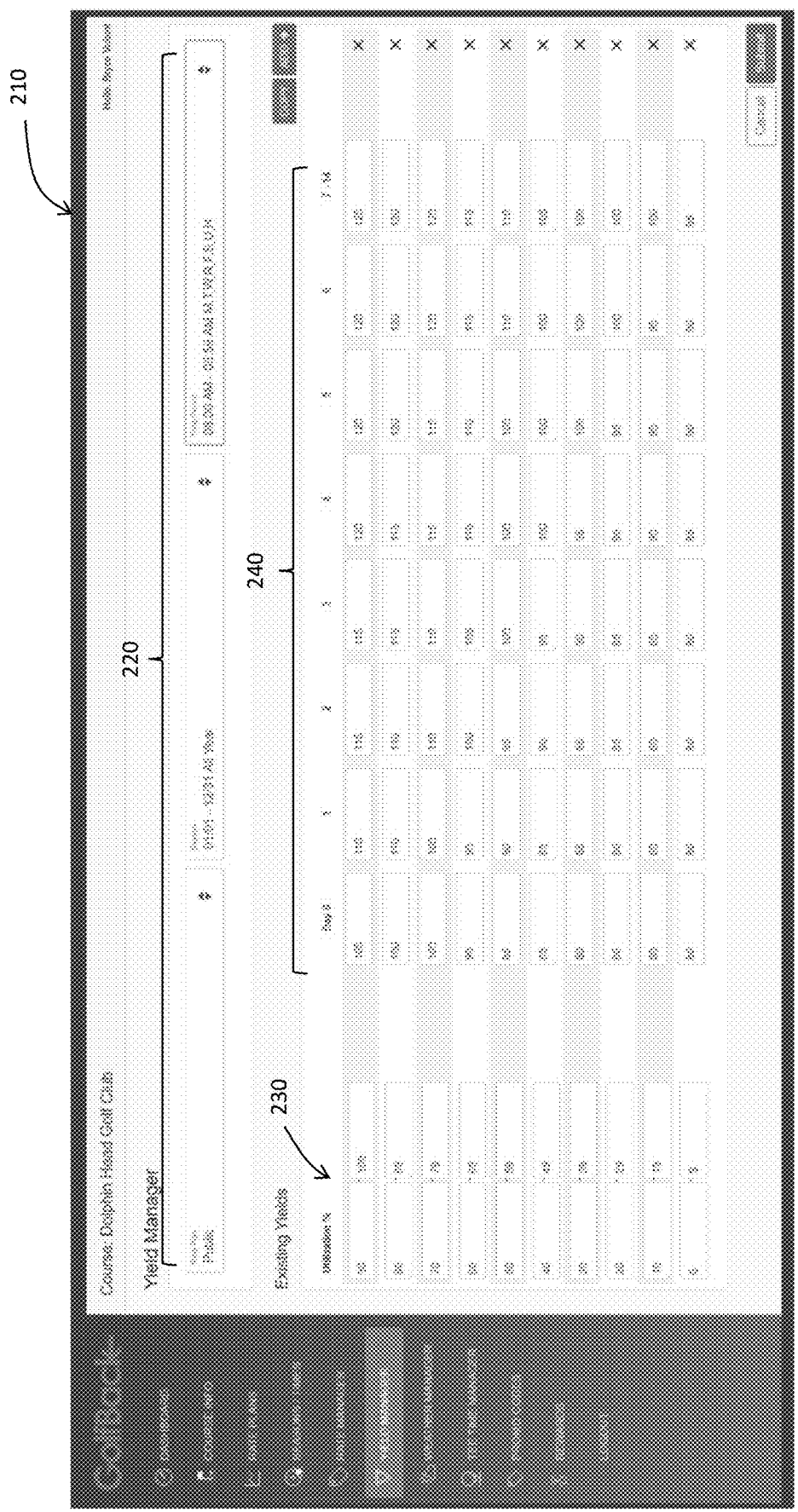
FIG. 2 illustrates an example view of an interface for managing yields.

Shown in FIG. 2 is a yield manager interface 210 in the form of a graphical user interface (GUI), which may be utilized for example by a golf course manager via a golf course computing system. As shown, the yield manager 220 provides the user with the ability to form a base rate, e.g., select a rate type, e.g., public, a time slot or period, e.g., a day part, and provides utilizations and rates 230, e.g., percentage utilization range and associated rate adjustments 240 for a time series of days, e.g., 1, 2, 3, 4, 5, 6 and 7-14. This instructs or configures the management platform to dynamically adjust the base rate, configured via data 220, using the rate adjustments 240 given the amount of utilization, mapped to the categories 230. For example, if a day part's tee times are being under-utilized, the management platform is configured to adjust the rate dynamically downward based on the utilization rate categories 230 and the rate adjustments 240 applied to the base rate 220. Similarly, if utilization is at or near capacity, the management platform is configured to increase the rate for tee times associated with that day part. In the example of FIG. 2, the day part is 8:00 AM to 8:50 AM, although other periods of time may be used as day parts and it will be appreciated that many day parts may be used to encompass the entire period of time at which the inventory may be utilized at a facility. This permits a fine or granular control over time-based inventory. As further described herein, the management platform permits the user to manage the inventory dynamically based on utilization as well as dynamically updated data, including forecast data for future periods of time.

Figure 3:
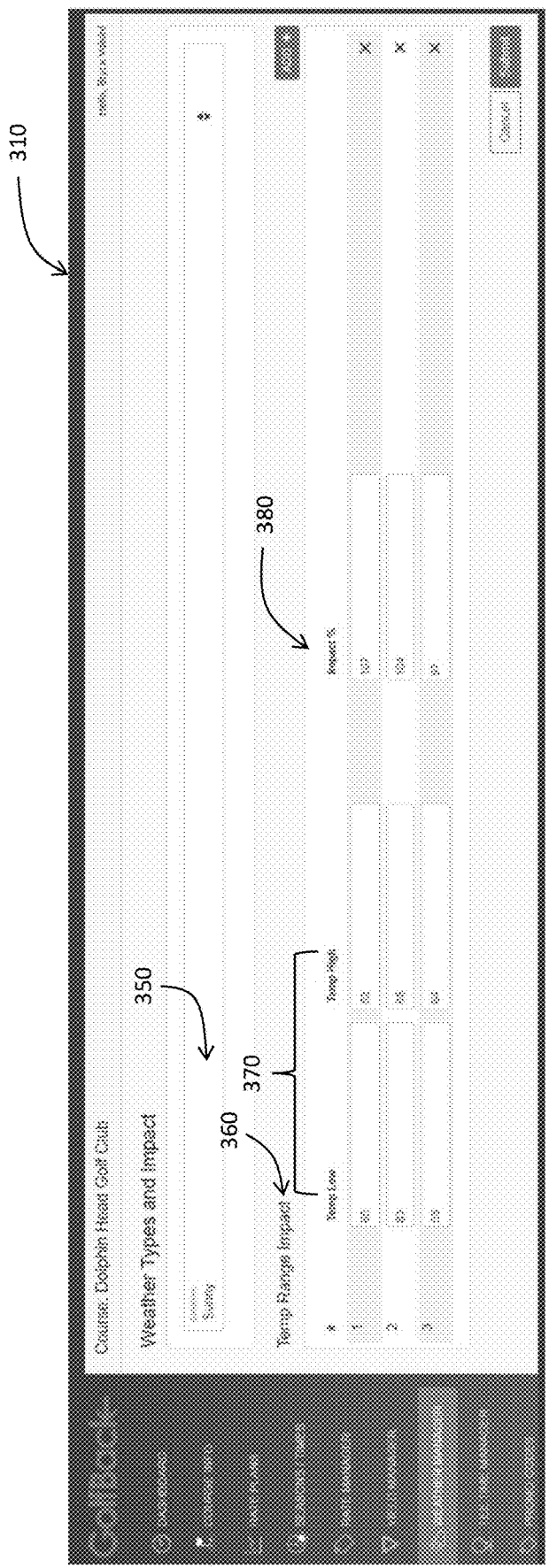
FIG. 3 illustrates an example view of an interface for managing weather data rule(s).

Referring to FIG. 3, in addition to permitting a system user (e.g., golf course manager) to set rates for day parts based on utilizations, the system allows the user to specify that other data is to be used in addition to or in lieu of utilization data. By way of specific example, as shown in FIG. 3 is a weather data GUI 310 that permits the user to specify in an impact area 360 that weather data 350, 370 may be utilized by the management platform to adjust the dynamic pricing of inventory such as tee times, e.g., per day part. By way of example, the view of FIG. 3 shows a GUI 310 in which a user may specify that a type of weather 350, e.g., sunny, cloudy, rain or precipitation, as per forecast data associated with the date and time of the tee time or day part, is to be utilized, as further described herein. Further, higher granularity controls for use of weather data may be provided by the system. For example, in the view of FIG. 3 it is shown that the user may specify specific temperatures at 370 that impact the dynamic pricing. In the example of FIG. 3, a user has input that a temperature range of 64 degrees to 82 degrees is to be utilized, with an impact metric of 107%, i.e., if the weather type 350 is sunny and the temperature is between 64 degrees and 84 degrees, the base price for the day part is to be adjusted to 107%. Further, as shown in FIG. 3, multiple such temperature ranges may be specified using GUI control 370. In practice, this configures the management platform to operate based on weather data, where the weather data impacts the pricing. The GUI 310 shown in FIG. 3 is an example of the inputs that may be used to configure the impact.

The forecast data may be received by the platform from a remote service, e.g., a cloud or server-based service that delivers data in a predetermined format, e.g., JavaScript Object Notation (JSON) format, which is then parsed, mapped and utilized by the platform to adjust web page display data, e.g., data 102, dynamically. As in the example of FIG. 4A-4B, an example JSON forecast message is shown, with the first part being located in FIG. 4A and the second part being located in FIG. 4B. This forecast data received may include data for forming a time series mapped to a time series of inventory items, e.g., forecast data is associated with respective future days having configuration data for a day part, as configured in the management platform in connection with FIG. 2 and FIG. 3.

In the example of FIG. 4A-B, an embodiment takes information provided from an application programming interface (API) response of a remote weather service, e.g., a JSON message and its associated hierarchical data indicated in FIG. 4A-B (noting that FIG. 4A includes the first part of the message and FIG. 4B includes the second part of the message), and compares the parameters set by the user per the examples of FIG. 1-FIG. 3 to determine a final price for tee time inventory, e.g., per day or day part. In one example, an embodiment traverses the hierarchical data to identify predetermined data elements such as:

"dt_txt"—a date/time parameter used to determine the time and date of the respective inventory, e.g., tee time;

"city" & "country"—a parameter used to determine the location for the respective inventory, e.g., golf course;

"weather"→"main"—a parameter used to capture the main description of the weather forecast and relate it to a respective user configuration such as weather type 350, e.g., sunny, rain, etc.; and "temp-min" and "temp-max"—parameters used to compare against respective thresholds set forth by the user, e.g., per GUI element 370, and determine the final price.

As may be appreciated, different forecasting data and data formats may be utilized and mapped to different or similar user configuration data, depending on the use case at hand.

An embodiment utilizes the user selections and the dynamically updating forecast data to determine updates to respective web page displays or display parts, sections or segments, e.g., pricing information associated with a web site. By way of specific example, shown in FIG. 4C is a weather impact calculation that illustrates how the management platform may use external data, e.g., weather forecast data from a weather data feed, to impact the dynamic pricing for a tee time, multiple tee times (e.g., for a day part), etc., and the respective web site displays, given the configurations. As shown in FIG. 4C, the calculation includes determining a utilization (here "53%"), determining a time period and its associated base rate (here "Public" and "90.00"), a yield time period and specified yield (here "11:00 AM-12:59 AM" and "50-59" (percent), respectively), a yield percent associated therewith via the yield utilization level (here "85%"), and a day out (how long until the day containing the tee time occurs (here "0") (refer to FIG. 2). This allows the calculation of a dynamic base rate based on the current utilization only. For example, the dynamic base rate is calculated as $76.50, where the basic public rate of $90.00 is multiplied by the yield percent (85%).

However, as described herein, additional data such as weather forecast data may be dynamically determined and included in the calculation. For example, taking into account the current weather forecast data for the associated time of the inventory availability and the configurations set by a user (see FIG. 3), the system can calculate that the weather forecast data, here "78.13 F Sunny," indicates that the weather threshold percentage to be applied is "107%" and the resultant rate is dynamically determined to be $81.86, which may be rounded to the nearest dollar ($82). This is the dynamic price data that will be utilized to update a web page, mobile application display, etc., and displayed to the end user, e.g., golfer looking to book a tee time, by the system automatically based on the configurations. As per this one example, the price may be increased even though the typical tee time would be considered less valuable. However, due to the weather forecast being good, it is considered more valuable. Thus, an inventory management platform is provided that links the ability to use utilization targets as well as dynamically changing data, here weather forecast data, to a system that automatically updates web page displays.

Figure 5:
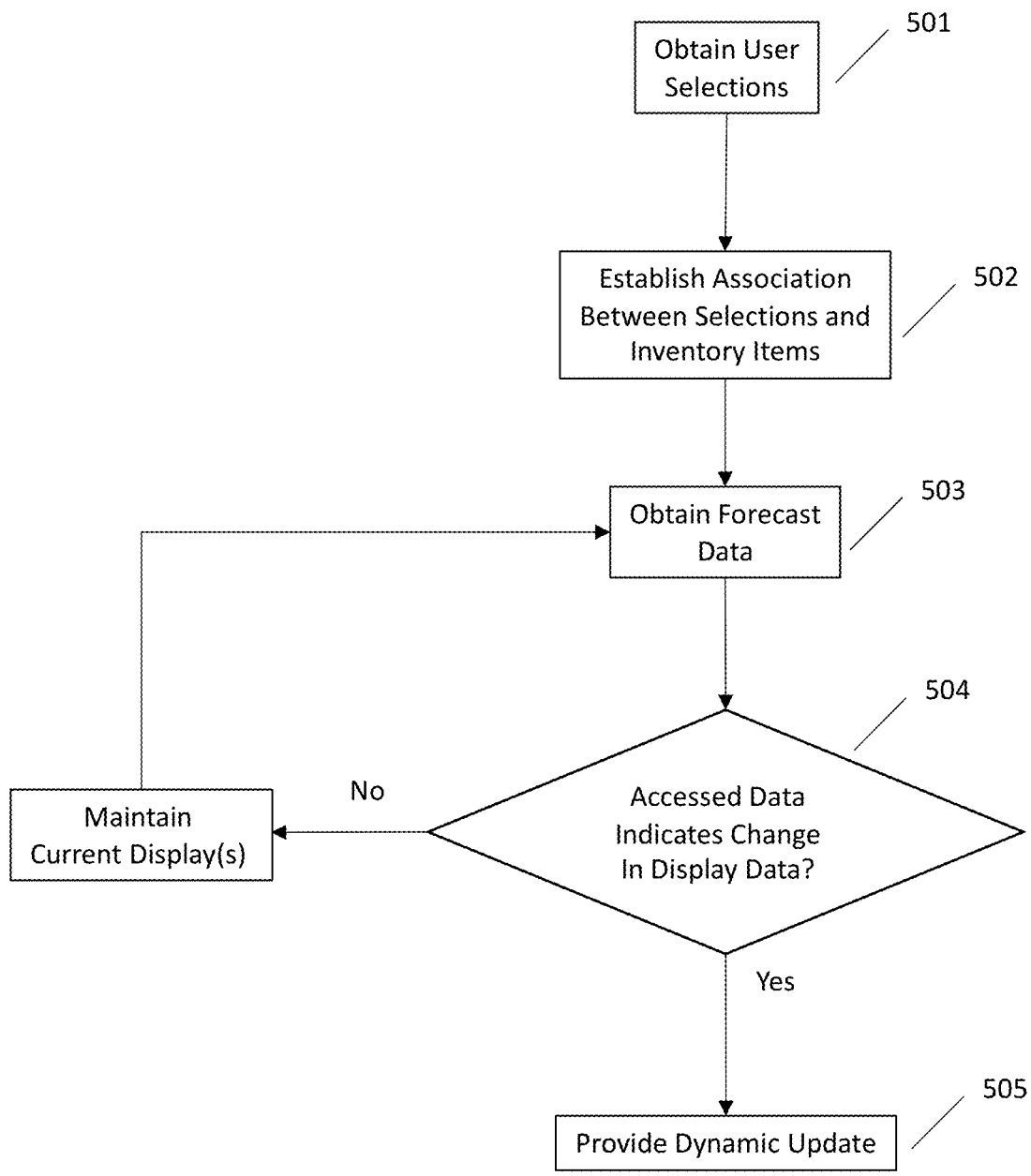
FIG. 5 illustrates an example method.

Turning to FIG. 5, an embodiment provides a method of using configurations and dynamically updated or streamed data to automatically adjust web site displays. As illustrated in the example of FIG. 5, an embodiment obtains user selections at 501, e.g., user configurations of parameters such as utilization rates or ranges, weather impact metrics or data useful in deriving the same, such as temperature ranges, weather type, etc. An embodiment establishes an association between the user selections or configurations and inventory items at 502. For example, an embodiment associates the user selections with a series of days for a day part for tee times, which may be available at one or more locations.

An embodiment also obtains forecast data at 503, e.g., as a time series of data that is time stamped or otherwise associated with a time period and may be matched or associated with days for day parts and related configurations. This permits an embodiment to associate dynamically changing data, such as weather forecast data, with specific inventory items, e.g., a time series of inventory items such as days in the future for a day part for a tee time.

An embodiment thereafter determines at 504 if the data obtained or accessed indicates that a change is appropriate, e.g., to a base rate or adjusted base rate (e.g., adjusted based on user configurations related to utilization). For example, weather forecast data obtained as a time series or data stream may be examined and matched to a particular day and day part associated with inventory. Thereafter, the base rate or adjusted base rate may be used in connection with a weather impact metric identified using the respective forecast data.

As indicated at 505, if the updated rate is different than the current rate, displayable data may be communicated to an appropriate end point to adjust or update a web site display, e.g., providing an update to a web server. In a similar manner, if no rate has been set or displayed yet, the determined rate may be used as the initial rate, which thereafter may be adjusted based future data obtained as indicated at 501 and/or 503. Further, the providing of a dynamic update at 505 may be responsive to a client request, e.g., to refresh a web application or mobile application to account for changing weather. A responsive technique may be utilized to reduce the number of dynamic updates, which may otherwise be provided according to a predetermined schedule, e.g., daily, hourly, etc.

Figure 6:
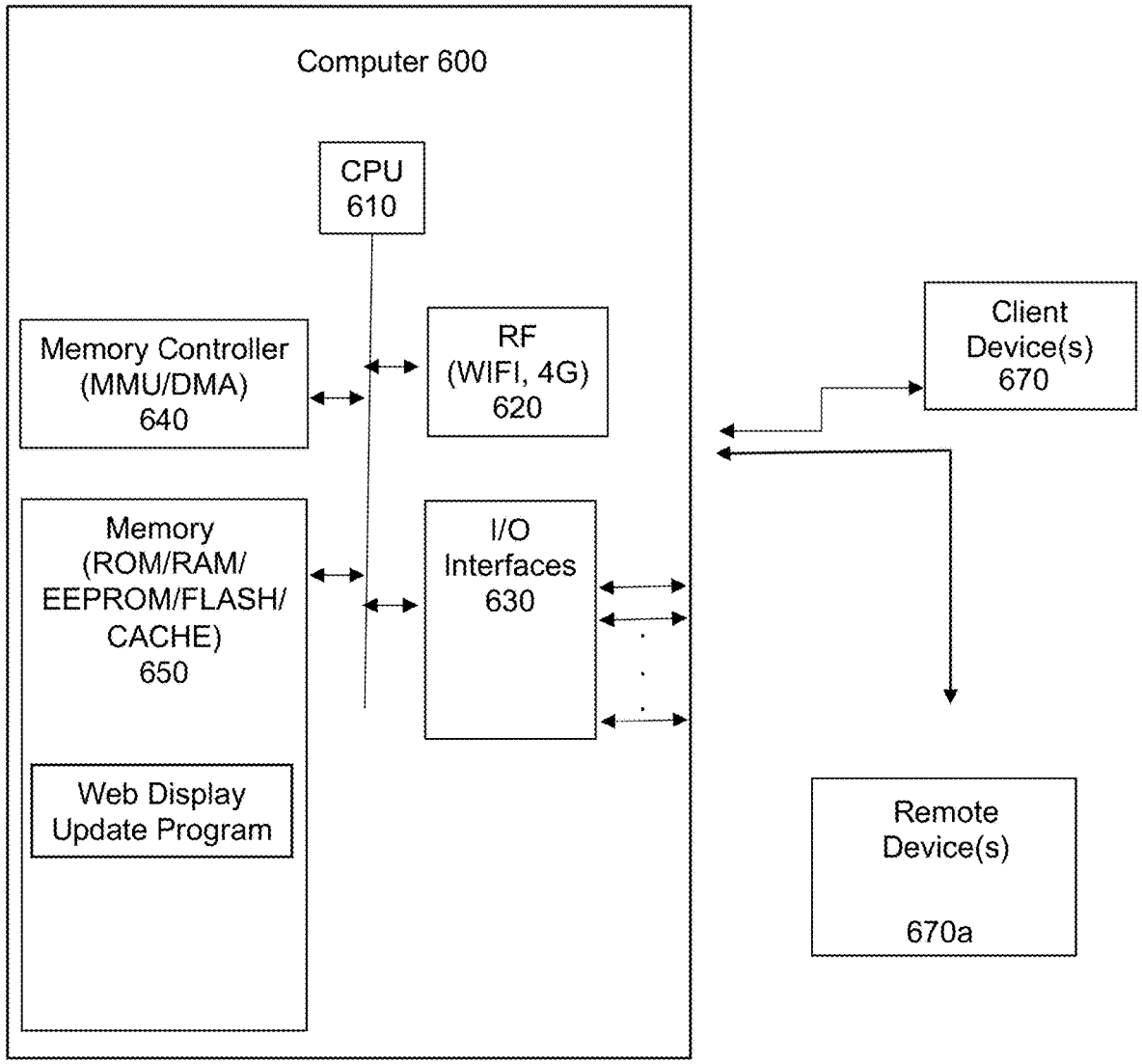
FIG. 6 illustrates an example system.

It will be readily understood that certain embodiments can be implemented using any of a wide variety of devices or combinations of devices. Referring to FIG. 6, an example system or computer 600 is illustrated, which may be used in implementing one or more embodiments. The computer 600 or similar circuitry outlined in FIG. 6 may be implemented in a variety of devices in addition to a computer 600 used to implement the platform, for example similar circuitry may be included in a client system or device 670 or another device or platform 1870a, such as a server. In addition, circuitry other than the example of FIG. 6 may be utilized in one or more embodiments. FIG. 6 includes functional blocks, as illustrated, which may be integrated onto a single semiconductor chip to meet specific application requirements.

The central processing unit (CPU) 610, which may include or alternatively be provided as one or more graphics processing units (GPUs) and/or micro-processing units (MPUs), includes an arithmetic logic unit (ALU) that performs arithmetic and logic operations, instruction decoder that decodes instructions and provides information to a timing and control unit, as well as registers for temporary data storage. The CPU 610 may comprise a single integrated circuit comprising several units, the design and arrangement of which vary according to the architecture chosen.

Computer 600 also includes a memory controller 640, e.g., comprising a direct memory access (DMA) controller to transfer data between memory 650 and hardware peripherals. Memory controller 640 includes a memory management unit (MMU) that functions to handle cache control, memory protection, and virtual memory. Computer 600 may include controllers for communication using various communication protocols (e.g., I$^2$C, USB, etc.).

Memory 650 may include a variety of memory types, volatile and nonvolatile, e.g., read only memory (ROM), random access memory (RAM), electrically erasable programmable read only memory (EEPROM), Flash memory, and cache memory. Memory 650 may include embedded programs and downloaded software, e.g., dynamic web display update programs or software, etc. By way of example, and not limitation, memory 650 may also include an operating system, application programs, other program modules, and program data.

A system bus permits communication between various components of the computer 1800. I/O interfaces 630 and radio frequency (RF) devices 620, e.g., WIFI and telecommunication radios, BLE devices, etc., are included to permit computer 600 to send and receive data to device(s) 670 or remote devices 670*a* using wired or wireless mechanisms. The computer 600 may operate in a networked or distributed environment using logical connections to one or more other remote computers or databases. The logical connections may include a network, such as a personal area network (PAN), a local area network (LAN) or a wide area network (WAN) but may also include other networks/buses. For example, computer 600 may communicate data with and between a device 670 and remote device(s) 670*a* over the Internet.

The computer 600 may therefore execute program instructions configured to store and analyze tee sheet data, weather forecast data, user input configuration data, and other data, and perform other functionality of the embodiments, as described herein. A user can interface with (for example, enter commands and information) the computer 600 through input devices, which may be connected to I/O interfaces 630. A display or other type of device may also be connected or coupled to the computer 600 via an interface selected from I/O interfaces 630.

It should be noted that the various functions described herein may be implemented using executable instructions stored in a memory, e.g., memory 650, that are transmitted to and executed by a processor, e.g., CPU 610. Computer 600 includes one or more storage devices that persistently store programs and other data. A storage device, as used herein, is a non-transitory storage medium. Some additional examples of a non-transitory storage device or medium include, but are not limited to, storage integral to computer 600, such as a hard disk or a solid-state drive, and removable storage, such as an optical disc or a memory stick.

Program code stored in a memory or storage device may be transmitted using any appropriate transmission medium, including but not limited to wireless, wireline, optical fiber, cable, RF, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on another device. In some cases, the devices may be connected through any type of connection or network, including a LAN, a WAN, a short-range wireless mechanism such as a PAN, a near-field communication mechanism, or the connection may be made through other devices (for example, through the Internet using an Internet Service Provider), using wireless connections or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device to produce a special purpose machine, such that the instructions, which execute via a processor of the device implement the functions/acts specified.

It is worth noting that while specific elements are used in the figures, and a particular ordering of elements has been illustrated, these are non-limiting examples. In certain contexts, two or more elements may be combined, an element may be split into two or more elements, or certain elements may be re-ordered or re-organized or omitted as appropriate, as the explicit illustrated examples are used only for descriptive purposes and are not to be construed as limiting.

Although illustrative example embodiments have been described herein with reference to the accompanying figures, it is to be understood that this description is not limiting, and that various other changes and modifications may be affected therein by one skilled in the art without departing from the scope or spirit of the disclosure.

What is claimed is:

1. A method, comprising:
   obtaining, using one or more processors of a management platform, data supplied via a plurality of user selections into a graphical user interface (GUI) displayed on a remote client device, the data comprising:
   a user selection in a day part field and field data entered in impact fields of a matrix area, each of the impact fields being associated with a series of days and respective utilization fields; and
   a user selection of a forecast type and user-specified forecast impact fields, each of the forecast impact fields being associated with a user configured series of numeric ranges;
   responding, at the management platform, to the data supplied via the plurality of user selections by dynamically changing display data of a presentation area in a public web page, the presentation area displaying a first value for one of a plurality of inventory items, the presentation area associated by the management platform with the day part field, wherein the first value dynamically changes in response to changing utilization data and forecasting data per the data supplied via the plurality of user selections;
   obtaining, using the management platform, the forecasting data via an application programming interface (API) call issued over a network connection to a remote system;
   the forecasting data being obtained as a hierarchical object;
   parsing and extracting, using the management platform, a series of data elements of the hierarchical object to identify forecast data elements comprising:
   a forecast element having a value matching the user selection of a forecast type;
   a numeric value matching a respective one of the series of numeric ranges; and
   a time value matching the day part field;
   obtaining, using the management platform, utilization data for the day part from a database storing utilization data for the day part;
   determining, by the management platform, an adjustment to the first value based on the utilization data associating the impact fields of the matrix area for the day part and respective day of the series of days and the forecast data elements identified from the hierarchical object indicating a respective forecast impact field;

wherein the management platform identifies the respective forecast impact field based on both of the forecast element and the numeric value of the hierarchical object matching respective ones of the user selection of the forecast type and the respective one of the series of numeric ranges;

communicating, by the management platform, an update to the first value according to the adjustment to a web server providing the public webpage using a network connection between the management platform and the web server; and responsive to a client device request for the public web page, providing, using the web server, updated display data for the presentation area on the public web page comprising the adjustment to the first value obtained from the management platform.

2. The method of claim 1, wherein the providing display data comprises dynamically updating the first value responsive to the client device request.

3. The method of claim 1, wherein the providing display data comprises dynamically updating the first value according to a predetermined schedule.

4. The method of claim 1, wherein the providing display data comprises dynamically updating the first value each time a new utilization threshold is reached.

5. The method of claim 1, wherein the providing display data comprises dynamically updating the first value each time a forecast data element having a new type is obtained.

6. The method of claim 1, wherein the providing display data comprises dynamically updating the first value each time a new numerical range is matched to a forecast data element.

7. The method of claim 1, wherein the plurality of inventory items include one or more time sensitive inventory items.

8. A system, comprising: a management platform and a web server configured to execute computer program instructions to perform the method of claim 1.

9. A computer program product, comprising: a non-transitory computer readable storage medium that stores code executable by a set of one or more processors, the code comprising: code that performs the method of claim 1.

* * * * *